United States Patent Office 3,239,514
Patented Mar. 8, 1966

3,239,514
PHENOTHIAZINE DERIVATIVES SUBSTITUTED BY A MONOVALENT SULFUR FUNCTION IN 3-POSITION
Jany Renz and Jean Pierre Bourquin, Basel, Guido Gamboni, Binningen, Basel-Land, and Gustav Schwarb, Basel, Switzerland, assignors to Sandoz Ltd., Basel, Switzerland
No Drawing. Filed Apr. 16, 1957, Ser. No. 653,058
Claims priority, application Switzerland, Apr. 19, 1956, 32,347/56
1 Claim. (Cl. 260—243)

The present invention relates to new and therapeutically useful phenothiazine derivatives which are substituted in the 3-position of the phenothiazine ring by a monovalent sulfur-function, and which are also substituted at the 10-position by the residue of an alkylamine.

The new phenothiazine derivatives of the invention correspond to the formula:

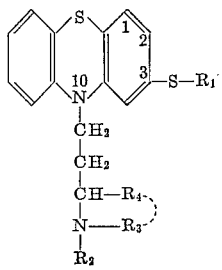

wherein $R_1$ stands for H, lower alkyl, phenyl or benzyl, $R_2$ stands for lower alkyl, $R_3$ stands for lower alkyl, and $R_4$ stands for H, or

stands for —CH$_2$—CH$_2$—CH$_2$— or

—CH$_2$—CH$_2$—CH$_2$—CH$_2$—

The new phenothiazine derivatives of Formula I can be prepared by condensing a phenothiazine of the formula:

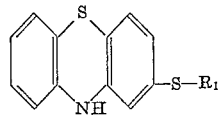

wherein $R_1$ has the afore-recited significances, with an ω-halogen-alkyl-amine of the formula:

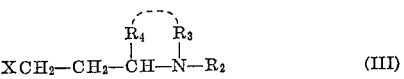

wherein $R_1$ has the afore-recited significances, with an ω-nificances, and X is Cl or Br.

The condensation can be carried out, for example, by dissolving a phenothiazine derivative of Formula II, which is substituted in 3-position by a monovalent sulfur-function, in a suitable organic solvent such for example as benzene, toluene or xylene, and then reacting the dissolved phenothiazine derivative with an ω-halogen-alkyl-amine of Formula III at room temperature or at elevated temperature in the presence in the reaction mixture of an alkaline condensing agent, such for example as sodium hydroxide, potassium hydroxide, sodamide, metallic sodium, lithium hydride, sodium tert.-butylate, etc., i.e., an alkali metal or a compound thereof such as the hydroxide, amide, hydride or alkanolate.

The reaction can also be carried out in the absence of a solvent, by fusing the reaction partners together; in this case it is posible also to omit the condensing agent, although this may reduce the yield.

Upon conclusion of the reaction, the reaction mixture is shaken out with water, and the solvent evaporated off under reduced pressure; however, the new compounds can also be extracted from the reaction mixture by dilute mineral or organic acids and precipitated from the aqueous phase by the addition of caustic alkali or ammonia. The bases can be filtered off in those cases where they separate out in the solid state or, where they separate out as oils, can be taken up in benzene or another water-immiscible solvent and then again freed of solvent by evaporation. The bases can be purified by distillation in a high vacuum and can be converted into appropriate salts with organic or inorganic acids.

The new phenothiazine derivatives of the present invention consist of 3-methylmercapto-10-[2'-(N-methyl-piperidyl-2'')-ethyl-1']-phenothiazine and its pharmaceutically acceptable non-toxic acid salts. These derivatives possess therapeutically valuable pharmaco-dynamic properties and are useful as neuroplegics.

The new compounds can be administered per os or parenterally.

The following illustrative examples set forth representative and presently preferred embodiments of the invention. In these examples, the parts are by weight unless otherwise indicated, the relationship between parts by weight and parts by volume being the same as that between grams and milliliters. Temperatures are set forth in degrees centigrade. Melting points and boiling points are uncorrected. Percentages are by weight.

Example 1

N-(m-methylmercapto-phenyl)-aniline (melting point 59–61°) is prepared by condensing m-methylmercapto-aniline (boiling point 163–165°/16 mm. Hg) with the potassium salt of o-chloro-benzoic acid and decarboxylating the resultant N-(m-methylmercapto-phenyl)-anthranilic acid (melting point 139–141°) by heating, and then distilling.

9.87 parts of N-(m-methylmercapto-phenyl)-aniline are heated with 2.93 parts of sulfur and 0.15 part of powdered iodine for 15 minutes in a bath at about 160°. Upon termination of the ensuing evolution of hydrogen sulfide, animal charcoal is added to the reaction mixture and recrystallization carried out first from 40 parts by volume of chlorobenzene, and then from 25 to 30 parts by volume of benzene at the boiling temperature. The obtained citron - yellow 3 - methylmercapto - phenothiazine has a melting point of 138–140°.

17.82 parts of 3 - methylmercapto-phenothiazine, 3.4 parts of finely pulverized sodamide and 80 parts by volume of absolute xylene are heated to boiling for two hours at a bath temperature of 180° under a reflux condenser and while stirring the reaction mixture. Without interrupting the heating, a solution of 13.2 parts of 2-(N-methyl-piperidyl-2')-1-chloro-ethane in 40 parts by volume of absolute xylene is then added dropwise in the course of 1½ hours. After further heating for three hours, the reaction mixture is cooled and, after the addition of 5 parts of ammonium chloride, is shaken three times with water, using 25 parts by volume each time. The xylene solution is extracted once with 35 parts by volume of 3-normal acetic acid and then three times, each time with 15 parts by volume of the said acid, after which the acetic acid extract is washed with 60 parts by volume of ether and is then made phenolphthalein-alkaline by means of 25 parts by volume of concentrated aqueous caustic soda solution. The precipitated oily base is taken up in a total of 100 parts by volume of benzene. The benzene layer, dried over potassium carbonate, is filtered and then evaporated under reduced pressure. The residue from the evaporation is distilled in a high vacuum; after separating a preliminary distillate which passes over up to 228° under a pressure of 0.02 mm. Hg, the principal fraction—3-methylmercapto-10-[2'-(N-methyl-piperidyl-2")) - ethyl - 1']- phenothiazine—which distils over at 228–232° under the last-mentioned pressure, is collected. The analytically pure base has a boiling point of 230°/0.02 mm. Hg.

Upon adding a solution of 15.3 parts of the free base in 125 parts by volume of ethyl acetate to a solution, cooled to 0°, of 6.78 parts of tartaric acid in 1150 parts by volume of ethyl acetate, the tartrate of 3-methylmercapto-10-[2'-(N-methyl-piperidyl-2")-ethyl - 1'] - phenothiazine precipitates. The salt, which contains 1 mol of water of crystallization, decomposes above 130° after sintering beginning at 70°.

*Example 2*

20.43 parts of 3-methylmercapto-phenothiazine, 3.90 parts of finely pulverized sodamide and 100 parts by volume of absolute xylene are heated to boiling for two hours at a bath temperature of 180° under a reflux condenser and while stirring the reaction mixture. Without interrupting the heating, a solution of 12.65 parts of 3-dimethylamino-1-chloro-propane (boiling point 134–135°) in 12 parts by volume of absolute xylene is then added dropwise in the course of 1½ hours. After further heating for three hours, the reaction mixture is cooled and, after the addition of 5 parts of ammonium chloride, is shaken three times with water, using 30 parts by volume each time. The xylene solution is extracted once with 50 parts by volume of 3-normal acetic acid and then three times, each time with 15 parts by volume of the said acid, after which the acetic acid extract is washed with 80 parts by volume of ether and is then made phenolphthaleinalkaline by means of 30 parts by volume of concentrated aqueous caustic soda solution. The precipitated oily base is taken up in a total of 150 parts by volume of benzene. The benzene layer, dried over potassium carbonate, is filtered and then evaporated under reduced pressure. The residue from the evaporation is distilled in a high vacuum; after separating a preliminary distillate which passes over up to 190° under a pressure of 0.01 mm. Hg, the principal fraction—3-methylmercapto - 10 - (3' - dimethylamino-propyl-1')-phenothiazine—which distils over at 191–193° under the last mentioned pressure, is collected. The analytically pure base has a boiling point of 192°/0.01 mm. Hg.

Upon adding a solution of 16.13 parts of the free base in 150 parts by volume of ethyl acetate to a solution, cooled to 0°, of 7.32 parts of tartaric acid in 1300 parts by volume of ethyl acetate, the tartrate of 3-methylmercapto-10-(3'-dimethylamino-propyl - 1') - phenothiazine precipitates. The salt, which contains ½ mol of water of crystallization, decomposes above 110° (foaming) after sintering beginning at 60°.

*Example 3*

N-(m-isopropylmercapto-phenyl)-aniline (boiling point 143°/0.005 mm. Hg) is prepared by reducing m-isopropylmercapto-nitrobenzene (boiling point 148–150°/11 mm. Hg) with stannous chloride and hydrochloric acid to yield m-isopropylmercapto aniline (boiling point 142–144°/10 mm. Hg), which is then condensed with the potassium salt of o-chloro-benzoic acid, and the resultant N-(m-isopropylmercapto-phenyl)-anthranilic acid (melting point 114–116°) decarboxylated by heating, and then distilled.

17.0 parts of N-(m-isopropylmercapto-phenyl)-aniline are heated with 4.47 parts of sulfur and 0.2 part of powdered iodine for ½ hour in a bath at 160°. Upon completion of the ensuing evolution of hydrogen sulfide, the reaction mixture is dissolved in 25 parts by volume of benzene, filtered, and 40 parts by volume of petroleum ether added to the warm filtrate, whereupon crystalline 3-isopropylmercapto-phenothiazine separates out. After recrystallization from 25 parts by volume of benzene and 40 parts by volume of petroleum ether, analytically pure 3-isopropylmercaptophenothiazine is obtained as citron-yellow crystals which melt at 118–120°.

30.0 parts of 3-isopropylmercapto-phenothiazine, 5.15 parts of finely pulverized sodamide and 135 parts by volume of absolute xylene are heated to boiling for 2 hours at a bath temperature of 180° under a reflux condenser and while stirring the reaction mixture. Without interrupting the heating, a solution of 20.0 parts of 2-(N-methyl-piperidyl-2')-1-chloro-ethane in 25 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 60 parts by volume of 3-normal acetic acid and then three times, each time with 30 parts by volume of the said acid, after which the acetic acid extract is washed with 100 parts by volume of benzene and is then made phenolphthalein-alkaline by means of 40 parts by volume of concentrated aqueous caustic soda solution. The precipitated oily base is taken up in a total of 200 parts by volume of benzene. The benzene layer, dried over potassium carbonate, is filtered and then evaporated under reduced pressure. The residue from the evaporation is distilled in a high vacuum; after separating a preliminary distillate which passes over up to 222° under a pressure of 0.005 mm. Hg, the principal fraction—3-isopropylmercapto-10-[2'-(N-methyl-piperidyl-2")-ethyl-1']-phenothiazine — which distils over at 222–224° under the last mentioned pressure, is collected. The analytically pure base has a boiling point of 223°/0.005 mm. Hg.

Upon adding a solution of 22.0 parts of the free base in 125 parts by volume of ethyl acetate to a solution, cooled to 0°, of 8.25 parts of tartaric acid in 1400 parts by volume of ethyl acetate, the tartrate of 3-isopropylmercapto-10[2'-(N-methyl-piperidyl-2")-ethyl-1'] - phenothiazine precipitates. The so-obtained salt decomposes above 120° after sintering beginning at 70°.

*Example 4*

30.0 parts of 3-isopropylmercapto-phenothiazine (melting point 118–120°), 5.15 parts of finely pulverized sodamide and 135 parts by volume of absolute xylene are heated to boiling for 2 hours at a bath temperature of 180° under a reflux condenser and while stirring the reaction mixture. Without interrupting the heating, a solution of 15.0 parts of 3-dimethylamino-1-chloro-propane (boiling point 134–135° at 760 mm. Hg) in 15 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 60 parts by volume of 3-normal acetic acid and then three times, each time with 30 parts by volume of the said acid, after which the acetic acid extract is washed with 100 parts by volume of benzene and is then made phenolphthalein-alkaline by means of 40 parts by volume of concentrated aqueous caustic soda solution. The precipitated oily base is taken up in a total of 200 parts by volume of benzene. The benzene layer, dried over potassium carbonate, is filtered and then evaporated under reduced pressure. The residue from the evaporation is distilled in a high vacuum; after separating a preliminary distillate which passes over up to 197° under a pressure of 0.01 mm. Hg, the principal fraction—3-isopropylmercapto - 10 - (3'-dimethylamino-propyl - 1') - phenothiazine—which distils over at 197–199° under the last-mentioned pressure, is collected. The analytically pure base has a boiling point of 198°/0.001 mm. Hg.

Upon adding a solution of 21.86 parts of the free base in 200 parts by volume of ethyl acetate to a solution, cooled to 0°, of 9.15 parts of tartaric acid in 1550 parts by volume of ethyl acetate, the tartrate of 3-isopropylmercapto-10 - (3'-dimethylamino-propyl-1') - phenothiazine precipitates. The salt, which contains ½ mol of water of crystallization, decomposes above 90° after sintering beginning at 60°.

*Example 5*

18.89 parts of 3-ethylmercapto-phenothiazine (melting point 95–97°), 3.41 parts of finely pulverized sodamide and 90 parts by volume of absolute xylene are heated to boiling for 2 hours at a bath temperature of 180° under a reflux condenser and while stirring the reaction mixture. Without interrupting the heating, a solution of 14.70 parts of 2-(N-methyl-piperidyl-2')-1-chloro-ethane (boiling point 84°/10 mm. Hg) in 15 parts by volume of absolute xylene is then added dropwise in the course of 1½ hours. After further heating for three hours, the reaction mixture is cooled and, after the addition of 5 parts of ammonium chloride, is shaken three times with water, using 25 parts by volume each time. The xylene solution is extracted once with 30 parts by volume of 3-normal acetic acid and then three times, each time with 15 parts by volume of the said acid, after which the acetic acid extract is washed with 60 parts by volume of benzene and is then made phenolphthalein-alkaline by means of 20 parts by volume of concentrated aqueous caustic soda solution. The precipitated oily base is taken up in a total of 100 parts by volume of benzene. The benzene layer, dried over potassium carbonate, is filtered and then evaporated under reduced pressure. The residue from the evaporation is distilled in a high vacuum; after separating a preliminary distillate which passes over up to 224° under a pressure of 0.008 mm. Hg, the principal fraction — 3-ethylmercapto-10-[2'-(N-methyl-piperidyl-2'')-ethyl-1']-phenothiazine—which distils over at 224–226° under the last mentioned pressure, is collected. The analytically pure base has a boiling point of 225°/0.008 mm. Hg.

Upon adding a solution of 7.72 parts of the free base in 60 parts by volume of ethyl acetate to a solution, cooled to 0°, of 3.0 parts of tartaric acid in 525 parts by volume of ethyl acetate, the tartrate of 3-ethylmercapto-10 - [2'-(N-methyl-piperidyl-2'')-ethyl-1']-phenothiazine preicpitates. The so-obtained salt decomposes above 135° after sintering beginning at 70°.

*Example 6*

20.0 parts of 3-ethylmercapto-phenothiazine, 3.62 parts of finely pulverized sodamide and 80 parts by volume of absolute xylene are heated to boiling for 2 hours at a bath temperature of 180° under a reflux condenser and while stirring the reaction mixture. Without interrupting the heating, a solution of 11.3 parts of 3-dimethyl-amino-1-chloro-propane in 12 parts by volume of absolute xylene is then added dropwise in the course of 1½ hours. After further heating for three hours, the reaction mixture is cooled and, after the addition of 10 parts of ammonium chloride, is shaken three times with water, using 30 parts by volume each time. The xylene solution is extracted once with 40 parts by volume of 3-normal acetic acid and then three times, each time with 15 parts by volume of the said acid, after which the acetic acid extract is washed with 80 parts by volume of ether and is then made phenolphthalein-alkaline by means of 25 parts by volume of concentrated aqueous caustic soda solution. The precipitated oily base is taken up in a total of 125 parts by volume of benzene. The benzene layer, dried over potassium carbonate, is filtered and then evaporated under reduced pressure. The residue from the evaporation is distilled in a high vacuum; after separating a preliminary distillate which passes over up to 199° under a pressure of 0.008 mm. Hg, the principal fraction — 3 - ethylmercapto - 10 - (3'-dimethylamino-propyl-1')-phenothiazine—which distils over at 199–201° under the last mentioned pressure, is collected. The analytically pure base has a boiling point of 200°/0.008 mm. Hg.

15.2 parts of the free base, 6.63 parts of tartaric acid and 200 parts by volume of absolute alcohol are boiled together whereupon, on cooling, the crystalline tartrate precipitates. The analytically pure tartrate of 3-ethylmercapto - 10 - (3' - dimethylamino-propyl-1')-phenothiazine, obtained after recrystallization from absolute alcohol, has a melting point of 117–119° (decomposition) after sintering beginning at 110°.

*Example 7*

N - (m - n - propylmercapto-phenyl) - anilline (boiling point 170–173°/0.01 mm. Hg) is prepared by reducing m-n-propyl-mercapto-nitrobenzene (boiling point 163–165°/11 mm. Hg) with stannous chloride and hydrochloric acid, yielding m-n-propyl-mercapto-aniline (boiling point 154–157°/11 mm. Hg), which is condensed with the potassium salt of o-chloro-benzoic acid, and the resultant N-m-n-propylmercapto-phenyl)-anthranilic acid (melting point 99–101°) decarboxylated by heating, and then distilled.

25.8 parts of N-(m-n-propylmercapto-phenyl)-aniline are heated with 6.75 parts of sulfur and 0.35 part of powdered iodine for 2 hours in a bath at 160°. Upon completion of the ensuing evolution of hydrogen sulfide, the reaction mass is distilled under reduced pressure. After separating a preliminary distillate which passes over up to 202° under a pressure of 0.03 mm. Hg, the principal fraction distils at 202–210°/0.03 mm. Hg. This latter distillate is dissolved in 100 parts by volume of benzene, filtered, and 100 parts by volume of petroleum ether added to the warm filtrate. After a further recrystallization from 100 parts by volume of benzene and 100 parts by volume of petroleum ether, analytically pure 3 - n - propylmercapto-phenothiazine is obtained as pale yellow platelets which melt at 107–109°.

27.0 parts of the so-obtained 3-n-propylmercapto-phenothiazine, 4.62 parts of finely pulverized sodamide and 130 parts by volume of absolute xylene are heated to boiling for 2 hours at a bath temperature of 180° under a reflux condenser and while stirring the reaction mixture. Without interrupting the heating, a solution of 18.0 parts of 2-(N-methyl-piperidyl-2')-1-chloro-ethane (boiling point 84°/10 mm. Hg) in 20 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 60 parts by volume of 3-normal acetic acid and then three times, each time with 30 parts by volume of the said acid, after which the acetic acid extract is washed with 100 parts by volume of benzene and is then made phenolphthalein-alkaline by means of 40 parts by volume of concentrated aqueous caustic soda solution. The precipitated oily base is taken up in a total of 200 parts by volume of benzene. The benzene layer, dried over potassium carbonate, is filtered and evaporated under reduced pressure. The residue from the evaporation is distilled under a high vacuum; after separating a preliminary distillate which passes over up to 246° under a pressure of 0.01 mm. Hg, the principal fraction—3-n-propylmercapto-10-[2' - (N-methyl-piperidyl-2'')-ethyl-1']-phenothiazine—which distils over at 246–248° under the last mentioned pressure, is collected. The analytically pure base has a boiling point of 247° at 0.01 mm. Hg.

Upon adding a solution of 12.0 parts of the free base in 100 parts by volume of ethyl acetate to a solution, cooled to 0°, of 4.50 parts of tartaric acid in 850 parts by volume of ethyl acetate, the tartrate of 3-n-propyl-mercapto-10 - [2' - (N - methyl-piperidyl-2'')-ethyl-1']-phenothiazine precipitates. The so-obtained salt decomposes above 120° (foaming) after sintering beginning at 70°.

*Example 8*

25.40 parts of 3-n-propylmercapto-phenothiazine (melting point 107–109°), 4.35 parts of finely pulverized sodamide and 125 parts by volume of absolute xylene are heated to boiling for two hours at a bath temperature of 180° under a reflux condenser and while stirring the reaction mixture. Without interrupting the heating, a solution of 13.60 parts of 3-dimethylamino-1-chloro-propane (boiling point 134–135°/760 mm. Hg) in 15 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 60 parts by volume of 3-normal acetic acid and then three times, each time with 30 parts by volume of the said acid, after which the acetic acid extract is washed with 100 parts by volume of benzene and is then made phenolphthalein-alkaline by means of 40 parts by volume of concentrated aqueous caustic soda solution. The precipitated oily base is taken up in a total of 200 parts by volume of benzene. The benzene layer, dried over potassium carbonate, is filtered and then evaporated under reduced pressure. The residue from the evaporation is distilled in a high vacuum; after separating a preliminary distillate which passes over up to 226° under a pressure of 0.02 mm. Hg, the principal fraction—3-n-propylmer-capto - 10-(3'-dimethylamino-propyl-1')-phenothiazine—which distils over at 226–228° under the last-mentioned pressure, is collected. The analytically pure base has a boiling point of 227° at a pressure of 0.02 mm. Hg.

Upon adding a solution of 14.6 parts of the free base in 100 parts by volume of ethyl acetate to a solution, cooled to 0°, of 6.10 parts of tartaric acid in 1100 parts by volume of ethyl acetate, the tartrate of 3-n-propyl-mercapto - 10 - (3' - dimethylamino - propyl - 1')-phenothiazine precipitates. The salt, which contains ½ mol of water of crystallization, decomposes above 90° (foaming) after sintering beginning at 55°.

*Example 9*

(a) m - n - Butylmercapto-aniline (boiling point 172–176°/13 mm. Hg) is condensed with the potassium salt of o-chloro-benzoic acid, and the resultant N-(m-n-butyl-mercapto-phenyl)-anthranilic acid (melting point 77–79°) is decarboxylated by heating and then distilling (boiling point 168–172°/0.01 mm. Hg) to yield N-(m-n-butylmercapto-phenyl)-aniline; melting point 30–32° from petroleum ether.

8.0 parts of N - (m-n-butylmercapto-phenyl)-aniline are heated with 2.0 parts of sulfur and 0.1 part of powdered iodine for ½ hour in a bath at 160°. Upon termination of the ensuing hydrogen sulfide evolution, the reaction mass is dissolved in 12 parts by volume of benzene, filtered, and 12 parts by volume of petroleum ether added to the warm filtrate, whereupon crystalline 3-n-butylmercapto-phenothiazine separates out. After recrystallization from 12 parts by volume of benzene and 15 parts by volume of petroleum ether, the analytically pure 3-n-butylmercapto-phenothiazine is obtained as yellow crystals which melt at 104–106°.

(b) 30.0 parts of 3 - n - butylmercapto-phenothiazine (melting point 104–106°), 4.90 parts of finely pulverized sodamide and 130 parts by volume of absolute xylene are heated to boiling for two hours at a bath temperature of 180° under a reflux condenser and while stirring the reaction mixture. Without interrupting the heating, a solution of 19.0 parts of 2-(N-methyl-piperidyl-2')-1-chloro-ethane in 20 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 175 parts by volume of aqueous tartaric acid of 15% strength and then three times, each time with 30 parts by volume of the said tartaric acid, after which the tartaric acid extract is washed with 100 parts by volume of benzene and is then made phenolphthalein-alkaline by means of 60 parts by volume of concentrated aqueous caustic soda solution. The precipitated oily base is taken up in 200 parts by volume of benzene. The benzene layer, dried over potassium carbonate, is filtered and then evaporated under reduced pressure. The residue from the evaporation is distilled in a high vacuum. After separating a preliminary distillate which passes over up to 226° under a pressure of 0.05 mm. Hg, the principal fraction—3-n-butylmercapto-10 - [2' - (N-methyl-piperidyl-2'')-ethyl-1']-phenothiazine—which distils at 226–228° under the last-mentioned pressure, is collected. The analytically pure base has a boiling point of 227° at 0.005 mm. Hg.

*Example 10*

30.0 parts of 3-n-butylmercapto-phenothiazine, 4.90 parts of finely pulverized sodamide and 130 parts by volume of absolute xylene are heated to boiling for two hours at a bath temperature of 180° under a reflux condenser and while stirring the reaction mixture. Without interrupting the heating, a solution of 14.3 parts of 3-dimethylamino-1-chloro-propane in 15 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 175 parts by volume of aqueous tartaric acid of 15% strength and then three times, using 30 parts by volume of the said tartaric acid each time, after which the tartaric acid extract is washed with 100 parts by volume of benzene and is then made phenolphthalein-alkaline by means of 60 parts by volume of concentrated aqueous caustic soda solution. The oily base which separates out is taken up in a total of 200 parts by volume of benzene. The benzene layer, dried over potassium carbonate, is filtered and is then evaporated under reduced pressure. The residue from the evaporation is distilled in a high vacuum. After separating a preliminary distillate which passes over up to 201° under a pressure of 0.005 mm. Hg, the principal fraction—3 - n - butylmercapto - 10 - (3' - dimethylamino-propyl-1')-phenothiazine—which distills at 201–203° under the last-mentioned pressure, is collected. The analytically pure base has a boiling point of 202° at 0.005 mm. Hg.

*Example 11*

(a) N-(m-isobutylmercapto-phenyl) - anthranilic acid (melting point 107–109°) is prepared by condensing m-isobutylmercapto-aniline (boiling point 168°/14 mm. Hg) with the potassium salt of o-chloro-benzoic acid and is then decarboxylated by heating to 250°. The so-obtained N-(m-isobutylmercapto-phenyl)-aniline is then distilled in a high vacuum (boiling point 148° at 0.008 mm. Hg).

20.0 parts of N-(m-isobutylmercapto-phenyl)-aniline are heated with 4.97 parts of sulfur and 0.25 part of powdered iodine for one-half hour in a bath at 160°. Upon termination of the ensuing evolution of hydrogen sulfide, the reaction mass is distilled in a high vacuum. After separating a preliminary distillate which passes over up to 209° under a pressure of 0.06 mm. Hg, the principal fraction—3-isobutylmercapto - phenothiazine—distils at 209–211° under the said pressure. The latter distillate is recrystallized from 65 parts by volume of 95% ethanol. The analytically pure 3-isobutylmercapto-phenothiazine melts at 94–96°.

(b) 30.0 parts of 3-isobutylmercapto-phenothiazine (melting point 94–96°), 4.90 parts of finely pulverized sodamide and 130 parts by volume of absolute xylene are heated to boiling for two hours at a bath temperature of 180° under a reflux condenser and while stirring the reaction mixture. Without interrupting the heating, a solution of 19.0 parts of 2-(N-methyl-piperidyl-2')-1-chloro-ethane in 20 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 150 parts by volume of aqueous tartaric acid of 15% strength and then three times, using 30 parts by volume of the said tartaric acid each time, after which the tartaric acid extract is washed with 100 parts by volume of benzene and is then made phenolphthalein-alkaline with 60 parts by volume of concentrated aqueous caustic soda solution. The precipitated oily base is taken up in a total of 200 parts by volume of benzene. The benzene layer, dried over potassium carbonate, is filtered and then evaporated under reduced pressure. The residue from the evaporation is distilled in a high vacuum. After separating a preliminary distillate which passes over up to 214° under a pressure of 0.003 mm. Hg, the principal fraction—3 - isobutylmercapto - 10 - [2' - (N - methyl-piperidyl-2")-ethyl-1']-phenothiazine—which distils at 214–216° under the last-mentioned pressure, is collected. The analytically pure base has a boiling point of 215° under a pressure of 0.003 mm. Hg.

*Example 12*

30.0 parts of 3-isobutylmercapto-phenothiazine, 4.90 parts of finely pulverized sodamide and 130 parts by volume of absolute xylene are heated to boiling for two hours at a bath temperature of 180° under a reflux condenser and while stirring the reaction mixture. Without interrupting the heating, a solution of 14.3 parts of 3-dimethyl-amino-1-chloro-propane in 15 parts by volume of absolute xylene is then added dropwise in the course of 1½ hours. After further heating for three hours, the reaction mixture is cooled and, after the addition of 10 parts of ammonium chloride, is shaken out three times with water, using 50 parts by volume each time. The xylene layer is extracted once with 175 parts by volume of aqueous tartaric acid of 15% strength and then three times, using 30 parts by volume of the said tartaric acid each time, after which the tartaric acid extract is washed with 100 parts by volume of benzene and is then made phenolphthalein-alkaline with 60 parts by volume of concentrated aqueous caustic soda solution. The precipitated oily base is taken up in a total of 200 parts by volume of benzene. The benzene layer, dried over potassium carbonate, is filtered and then evaporated under reduced pressure. The residue from the evaporation is distilled in a high vacuum. After separating a preliminary distillate which goes over up to 194° under a pressure of 0.004 mm. Hg, the principal fraction—3-isobutyl-mercapto - 10 - (3' - dimethylamino - propyl - 1') - phenothiazine—which distils at 194–196° under the last-mentioned pressure, is collected. The analytically pure base has a boilng point of 195° at a pressure of 0.004 mm. Hg.

*Example 13*

(a) N - (m - sec. - n - butylmercapto - phenyl) - anthranilic acid (melting point 68–70°), obtained by condensing m-sec.-n-butylmercapto-aniline (boiling point 160°/14 mm. Hg) with the potassium salt of o-chloro-benzoic acid, is decarboxylated by heating to 250°. The resultant N-(m-sec.-n-butylmercapto-phenyl)-aniline is then distilled in a high vacuum; boiling point 160° at 0.008 mm. Hg.

40.0 parts of N-(m-sec.-n-butylmercapto-phenyl)-aniline are heated with 9.94 parts of sulfur and 0.50 part of powdered iodine for one hour in a bath at 160°. Upon termination of the ensuing hydrogen sulfide evolution, the reaction mass is distilled in a high vacuum. After separating a preliminary distillate which goes over up to 205° under a pressure of 0.08 mm. Hg, the principal fraction—the 3-sec.-n-butylmercapto-phenothiazine—distils over at 205–210° under a pressure of 0.08 mm. Hg. The latter distillate is recrystallized from 75 parts by volume of 95% ethanol. The analytically pure, pale yellow 3-sec.-n-butylmercapto-phenothiazine melts at 88–90°.

(b) 30.0 parts of 3-sec.-n-butylmercapto-phenothiazine (M.P. 88–90°), 4.90 parts of finely pulverized sodamide and 130 parts by volume of absolute xylene are heated to boiling for two hours at a bath temperature of 180° under a reflux condenser and while stirring the reaction mixture. Without interrupting the heating, a solution of 19.0 parts of 2-(N-methyl-piperidyl-2')-1-chloro-ethane in 20 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 175 parts by volume of aqueous tartaric acid of 15% strength and then three times, each time with 30 parts by volume of the said tartaric acid, after which the tartaric acid extract is washed with 100 parts by volume of benzene and is made phenolphthalein-alkaline with 60 parts by volume of concentrated aqueous caustic soda solution. The precipitated oily base is taken up in a total of 200 parts by volume of benzene. The benzene layer, dried over potassium carbonate, is filtered and then evaporated under reduced pressure. The residue from the evaporation is distilled in a high vacuum. After separating a preliminary distillate which goes over up to 214° under a pressure of 0.007 mm. Hg, the principal fraction—3-sec.-n-butylmercapto-10-[2'-(N-methyl - piperidyl - 2") - ethyl - 1'] - phenothiazine—which distils at 214–216° under the last-mentioned pressure, is collected. The analytically pure base has a boiling point of 215° at 0.007 mm. Hg.

*Example 14*

30.0 parts of 3-sec.-n-butylmercapto-phenothiazine (M.P. 88–90°), 4.90 parts of finely pulverized sodamide and 130 parts by volume of absolute xylene are heated to boiling for two hours at a bath temperature of 180° under a reflux condenser and while stirring the reaction mixture. Without interrupting the heating, a solution of 14.3 parts of 3-dimethylamino-1-chloro-propane in 15 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 175 parts by volume of aqueous tartaric acid of 15% strength and then three times, each with 30 parts by volume of the said tartaric acid, after which the tartaric acid extract is washed with 100 parts by volume of benzene and is then made phenolphthalein-alkaline by means of 60 parts by volume of concentrated aqueous caustic soda solution. The oily base which separates out is taken up in a total of 200 parts by volume of benzene. The benzene layer, dried over potassium carbonate, is filtered and then evaporated under reduced pressure. The residue from the evaporation is distilled in a high vacuum. After separating a preliminary distillate which goes over up to 188° under a pressure of 0.006 mm. Hg, the principal fraction—3-sec.-n - butylmercapto-10 - (3' - dimethylamino - propyl - 1')-phenothiazine—which distils at 188–190° under the last-mentioned pressure, is collected. The analytically pure base has a boiling point of 189° under a pressure of 0.006 mm. Hg.

*Example 15*

59.0 parts of thionyl chloride are added dropwise, in the course of ten minutes at 10° and while stirring, to an HCl-saturated solution of 31.0 parts of 2-(N-methyl-pyrrolidyl-2')-ethane-1-ol in 200 parts by volume of chloroform. While continuing the stirring, the reaction mixture is then heated for two hours under reflux at a water-bath temperature of 70°, after which it is freed as far as possible from excess thionyl chloride and chloroform in a partial vacuum. The residue from this operation is taken up in 160 parts by volume of ice-cold 3-normal aqueous caustic soda solution and is then covered with 100 parts by volume of ether. After the adidtion of 30 parts of caustic potash, the whole is shaken out with ether three times, using 200 parts by volume of ether each time. The combined ether extracts are dried over a small quantity of sodium sulfate, filtered, and the solvent distilled off on a water-bath at about 40–50°. The so-obtained residue is then distilled under reduced pressure, the obtained 2-(N-methyl-pyrrolidyl-2')-1-chloro-ethane having a boiling point of 65° at a pressure of 13 mm. Hg.

16.65 parts of 3-methylmercapto-phenothiazine, 3.18 parts of finely pulverized sodamide and 100 parts by volume of absolute xylene are heated to boiling for two hours at a bath temperature of 180° under reflux and while stirring the reaction mixture. Without interrupting the heating, a solution of 10.0 parts of 2-(N-methyl-pyrrolidyl-2')-1-chloro-ethane in 10 parts by volume of absolute xylene is then added dropwise in the course of 1½ hours. After further heating for three hours, the reaction mixture is cooled and, after the addition of 5 parts of ammonium chloride, is shaken three times with water, using 50 parts by volume each time. The xylene solution is extracted once with 75 parts by volume of aqueous tartaric acid of 15% strength and then two times, using 20 parts by volume of the said tartaric acid each time, after which the tartaric acid extract is washed with 100 parts by volume of benzene and is made phenolphthalein-alkaline by means of 35 parts by volume of concentrated aqueous caustic soda solution. The precipitated oily base is taken up in a total of 175 parts by volume of benzene. The benzene layer, dried over potassium carbonate, is filtered and then evaporated under reduced pressure. The residue from the evaporation is distilled in a high vacuum; after separating a preliminary distillate which goes over up to 208° under a pressure of 0.008 mm. Hg, the principal fraction—3-methylmercapto-10-[2'-(N-methyl-pyrrolidyl-2'')-ethyl-1']-phenothiazine—which distils at 208–210° under the last-mentioned pressure, is collected. The analytically pure base, which corresponds to the formula

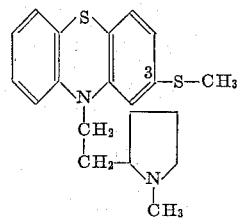

has a boiling point of 209° under a pressure of 0.008 mm. Hg.

Upon adding a solution of 14.40 parts of the free base in 125 parts by volume of ethyl acetate to a solution, cooled to 0°, of 6.06 parts of tartaric acid in 900 parts by volume of ethyl acetate, the tartrate of 3-methylmercapto - 10 - [2' - (N - methyl - pyrrolidyl - 2'') - ethyl-1']-phenothiazine precipitates; melting point of the tartrate is 115°, after sintering beginning at 70°.

*Example 16* m-Benzylmercapto-aniline (boiling point 163° at 0.06 mm. Hg) is condensed with the potassium salt of o-chloro-benzoic acid, and the resultant N-(m-benzylmercapto-phenyl)-anthranilic acid (melting point 137–139°) is decarboxylated by heating at 250°. The resultant N-(m-benzylmercapto-phenyl)-aniline is distilled in a high vacuum; boiling point 214° under a pressure of 0.2 mm. Hg, melting point 61–63°.

46.0 parts of N-(m-benzylmercapto-phenyl)-aniline are heated with 10.1 parts of sulfur and 0.5 part of powdered diodine for ½ hour in a bath at 160°. Upon termination of the ensuing hydrogen sulfide evolution, the reaction mass is recrystallized from the four-fold quantity of boiling benzene. The analytically pure, pale yellow 3-benzylmercapto-phenothiazine has a melting point of 155–157°.

25.0 parts of 3-benzylmercapto-phenothiazine, 3.64 parts of finely pulverized sodamide and 130 parts by volume of absolute xylene are heated to boiling for two hours at a bath temperature of 180° under a reflux condenser and while stirring the reaction mixture. Without interrupting the heating, a solution of 14.15 parts of 2-(N-methyl-piperidyl-2')-1-chloro-ethane in 15 parts by volume of absolute xylene is then added dropwise in the course of 1½ hours. After further heating for three hours, the reaction mixture is cooled and, after the addition of 10 parts of ammonium chloride, is shaken three times with water, using 50 parts by volume each time. The xylene solution is extracted once with 150 parts by volume of aqueous tartaric acid of 15% strength and then three more times, using 20 parts by volume of the said tartaric acid each time, after which the tartaric acid extract is washed with 100 parts by volume of benzene and is made phenolphthalein-alkaline with 55 parts by volume of concentrated aqueous caustic soda solution. The precipitated oily base is taken up in 200 parts by volume of benzene. The benzene layer, dried over potassium carbonate, is filtered and then evaporated under reduced pressure. The residue from the evaporation is distilled in a high vacuum. After separating a preliminary distillate which goes over up to 245° under a pressure of 0.01 mm. Hg, the principal fraction—3-benzylmercapto-10-[2'-(N-methyl-piperidyl-2'')-ethyl-1']-phenothiazine—which distils at 245–247° under the last-mentioned pressure, is collected. The analytically pure base has a boiling point of 246° at 0.01 mm. Hg.

Upon adding a solution of 21.9 parts of the free base in 200 parts by volume of ethyl acetate to a solution, cooled to 0°, of 7.37 parts of tartaric acid in 1100 parts by volume of ethyl acetate, the tartrate of 3-benzylmercapto - 10 - [2' - (N - methyl - piperidyl - 2'') - ethyl - 1']-phenothiazine precipitates. The thus-prepared tartrate, which contains ½ mol of water of crystallization, melts at 105° with evolution of gas, after sintering above 75°.

*Example 17*

25.0 parts of 3-benzylmercapto-phenothiazine, 3.64 parts of finely pulverized sodamide and 130 parts by volume of absolute xylene are heated to boiling for two hours at a bath temperature of 180° under a reflux condenser and while stirring the reaction mixture. Without interrupting the heating, a solution of 10.65 parts of 3-dimethylamino-1-chloro-propane in 12 parts by volume of absolute xylene is then added dropwise in the course of 1½ hours. After further heating for three hours, the reaction mixture is cooled and, after the addition of 10 parts of ammonium chloride, is washed three times with water, using 50 parts by volume each time. The xylene solution is extracted once with 150 parts by volume of aqueous tartaric acid of 15% strength and then three times, using 20 parts by volume of the said tartaric acid each time, after which the tartaric acid extract is washed with 100 parts by volume of benzene and is then made phenolphthalein-alkaline with 55 parts by volume of concentrated aqueous caustic soda solution. The precipitated oily base is taken up in a total of 200 parts by volume of benzene. The benzene layer, dried over potassium carbonate, is filtered and then evaporated under reduced pressure. The residue from the distillation is distilled in a high vacuum; after separation a preliminary distillate which passes over up to 223° under a pressure of 0.01 mm. Hg, the principal fraction—3-benzylmercapto-10-(3' - dimethylamino - propyl - 1')-phenothiazine—which distils at 223–225° under the last-mentioned pressure, is collected. The analytically pure base has a boiling point of 224° at a pressure of 0.01 mm. Hg.

Upon adding a solution of 19.70 parts of the free base in 150 parts by volume of ethyl acetate to a solution, cooled to 0°, of 7.28 parts of tartaric acid in 1100 parts of ethyl acetate, the tartrate of 3-benzylmercapto-10-(3'-dimethylamino-propyl - 1') - phenothiazine precipitates. The so-obtained salt melts at 85° with evolution of gas, after sintering above 65°.

*Example 18*

17.60 parts of 3-ethylmercapto-phenothiazine (melting point 95–97°), 3.18 parts of finely pulverized sodamide and 100 parts by volume of absolute xylene are heated to boiling for three hours at a bath temperature of 180° under a reflux condenser and while stirring the reaction mixture. Without interrupting the heating, a solution of 10.0 parts of 2-(N-methyl-pyrrolidyl-2')-1-chloro-ethane (boiling point 65° at 13 mm. Hg) in 10 parts by volume of absolute xylene is then added dropwise in the course of 1½ hours. After further heating for three hours, the reaction mixture is cooled and, after the addition of 5 parts of ammonium chloride, is shaken three times with water, using 50 parts by volume each time. The xylene solution is extracted once with 75 parts by volume of aqueous tartaric acid of 15% strength and then three more times, using 20 parts by volume of the said tartaric acid each time, after which the tartaric acid extract is washed with 100 parts by volume of benzene and is then made phenolphthalein-alkaline by means of 35 parts by volume of concentrated aqueous caustic soda solution. The precipitated oily base is taken up in a total of 175 parts by volume of benzene. The benzene layer, dried over potassium carbonate, is filtered and then evaporated under reduced pressure. The residue from the evaporation is distilled in a high vacuum; after separating a preliminary distillate, the principal fraction—3-ethylmercapto-10-[2'-(N-methyl-pyrrolidyl-2'')-ethyl-1']-phenothiazine—is collected. The analytically pure base has a boiling point of 213° under a pressure of 0.01 mm. Hg.

Upon adding a solution of 14.95 parts of the free base in 125 parts by volume of ethyl acetate to a solution, cooled to 0°, of 6.06 parts of tartaric acid in 900 parts by volume of ethyl acetate, the tartrate of 3-ethylmercapto-10-[2'-(N-methyl-pyrrolidyl-2'')-ethyl - 1']-phenothiazine precipitates; melting point 90° (decomposition) after sintering from 65°. The salt contains ½ mol of water of crystallization.

*Example 19*

18.52 parts of 3 - isopropylmercapto - phenothiazine (melting point 118–120°), 3.18 parts of finely pulverized sodamide and 100 parts by volume of absolute xylene are heated to boiling for three hours at a bath temperature of 180° under a reflux condenser and while stirring the reaction mixture. Without interrupting the heating, a solution of 10.0 parts of 2-(N-methyl-pyrrolidyl-2') - 1 - chloro-ethane in 10 parts by volume of absolute xylene is then added dropwise in the course of 1½ hours. After further heating for three hours, the reaction mixture is cooled and, after the addition of 5 parts of ammonium chloride, is shaken three times with water, using 50 parts by volume each time. The xylene solution is extracted once with 75 parts by volume of aqueous tartaric acid of 15% strength and then twice more, each time with 20 parts by volume of the said tartaric acid, after which the tartaric acid extract is washed with 100 parts by volume of benzene and is then made phenolphthalein-alkaline by means of 35 parts by volume of aqueous concentrated caustic soda solution. The precipitated oily base is taken up in a total of 175 parts by volume of benzene. The benzene layer, dried over potassium carbonate, is filtered and then evaporated under reduced pressure. The residue from the evaporation is distilled in a high vacuum; after separating a preliminary distillate, the principal fraction—3-isopropyl-mercapto-10-[2'-(N-methyl-pyrrolidyl-2'') - ethyl - 1']-phenothiazine—is collected. The analytically pure base has a boiling point of 217° at 0.008 mm. Hg pressure.

Upon adding a solution of 15.53 parts of the free base in 125 parts by volume of ethyl acetate to a solution, cooled to 0°, of 6.06 parts of tartaric acid in 900 parts by volume of ethyl acetate, the tartrate of 3-isopropyl-mercapto-10-[2'-(N-methyl-pyrrolidyl-2'') - ethyl - 1']-phenothiazine precipitates. The tartrate, which contains ½ mol of water of crystallization, has a melting point of 90° (decomposition) after sintering from 70°.

*Example 20*

19.50 parts of 3-n-butylmercapto-phenothiazine (melting point 104–106°), 3.18 parts of finely pulverized sodamide and 100 parts by volume of absolute xylene are heated to boiling for three hours at a bath temperature of 180° under a reflux condenser and while stirring the reaction mixture. Without interrupting the heating, a solution of 10.0 parts of 2-(N-methyl-pyrrolidyl-2') - 1 - chloro-ethane in 10 parts by volume of absolute xylene is then added dropwise in the course of 1½ hours. After further heating for three hours, the reaction mixture is cooled and, after the addition of 5 parts of ammonium chloride, is shaken three times with water, using 50 parts by volume each time. The xylene solution is extracted once with 75 parts by volume of aqueous tartaric acid of 15% strength and then two more times, using 20 parts by volume of the said tartaric acid each time, after which the tartaric acid extract is washed with 100 parts by volume of benzene and is then made phenolphthalein-alkaline with 35 parts by volume of concentrated aqueous caustic soda solution. The precipitated oily base is taken up in a total of 175 parts by volume of benzene. The benzene layer, dried over potassium carbonate, is filtered and evaporated under reduced pressure. The residue from the evaporation is distilled in a high vacuum; after separating a preliminary distillate, the principal fraction—3-n-butyl-mercapto-10-[2'-(N-methyl-pyrrolidyl-2'') - ethyl - 1']-phenothiazine—is collected. The analytically pure base boils at 225° under a pressure of 0.01 mm. Hg.

Upon adding a solution of 16.10 parts of the free base in 125 parts by volume of ethyl acetate to a solution, cooled to 0°, of 6.06 parts of tartaric acid in 900 parts by volume of ethyl acetate, the tartrate of 3-n-butylmercapto-10-[2'-(N-methyl-pyrrolidyl-2'')-ethyl-1'] - phenothiazine precipitates. This tartrate contains ½ mol of water of crystallization and melts at 75° (decomposition) after sintering from 60°.

*Example 21*

7.2 parts of metallic sodium are added in small portions in the course of two hours, while stirring and heating to 120°, to a solution of 27.8 parts of 3-benzylmercapto-10-[2'-(N-methyl-piperidyl-2'') - ethyl - 1'] - phenothiazine (boiling point 246° under a pressure of 0.01 mm. Hg) in 175 parts by volume of n-butanol, after which the reaction mixture is allowed to cool and is then rendered acid to Congo by means of ethanolic HCl. Precipitated sodium cholride is then filtered off, and the filtrate is evaporated under reduced pressure.

The residue from the evaporation is digested at 35° with 500 parts by volume of water and 100 parts by volume of concentrated aqueous ammonia, and insoluble residue is filtered off. A solution of 28 parts of silver nitrate in 150 parts by volume of water is added to the still warm filtrate, and the precipitated crude yellow silver salt is suction-filtered off and then washed on the filter with 50 parts by volume of 3-normal aqueous ammonia.

The moist silver salt is digested three times at 40°, using 150 parts of absolute ethanol each time, and is finally suction-filtered. A weak current of hydrogen sulfide is then passed for four hours and at room temperature through a suspension of the so-purified silver salt in 250 parts by volume of absolute ethanol, after which silver sulfide is removed by filtration, washed with 25 parts by volume of absolute ethanol, and the filtrate evaporated under reduced pressure.

0.5 part of the residue from the last-mentioned evaporation is dissolved at 40° in 25 parts by volume of water and 5 parts by volume of concentrated aqueous ammonia, filtered, and 26 parts by volume of a 1% aqueous silver nitrate solution added to the warm filtrate. The so-precipitated pure yellow silver salt of the base—3-sulfhydryl-10[2'-(N-methyl-piperidyl-2'')-ethyl-1'] - phenothiazine—is suction-filtered off. It melts at 188–190°, after sintering above 140°. The base itself corresponds to the formula

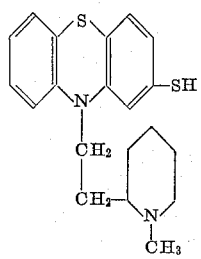

If 5.1 parts of the residue from the last-mentioned evaporation are dissolved in 90 parts by volume of chloroform and 100 parts by volume of ethyl acetate, and the solution is filtered into a solution, cooled to 0°, of 2.15 parts by weight of tartaric acid in 330 parts by volume of ethyl acetate, the pure tartrate of 3-sulfhydryl-10-[2'-(N-methyl-piperidyl-2''-ethyl-1'] - phenothiazine is precipitated. This tartrate melts at 115° (decomposition) after sintering above 80°, and contains ½ mol of water of crystallization.

It will be understood that the salts described in the preceding examples are merely illustrative and that other therapeutically useful salts with organic or inorganic acids can also be prepared in essentially analogous manner, e.g., the hydrochlorides, hydrobromides, phosphates, citrates, maleates, methane-sulfonates, and many others.

*Example 22*

3-ethylmercapto-phenothiazine, the starting material used in Examples 5, 6 and 18, is prepared in the following way:

N-(m-ethylmercapto - phenyl) - aniline (boiling point 140°/0.007 mm. Hg) is prepared by condensing m-ethylmercapto-aniline (boiling point 147–152°/10 mm. Hg) with the potassium salt of o-chloro-benzoic acid, and decarboxylating the resultant N - (m - ethylmercapto-phenyl)-anthranilic acid (melting point 114–116°) by heating, and then distilling.

5.39 parts of N-(m-ethylmercapto-phenyl)-aniline are heated with 1.51 parts of sulfur and 0.1 part of powdered iodine for 12 minutes in a bath at about 160°. Upon termination of the ensuing hydrogen sulfide evolution, animal charcoal is added to the reaction mixture which is then first recrystallized from 15 parts by volume of chlorobenzene. The crystals are then dissolved in 12 parts by volume of boiling benzene, and 12 parts by volume of petroleum ether are then added to the warm solution, whereupon 3-ethylmercapto-phenothiazine is obtained as a weakly yellow-colored crystalline substance which melts at 95–97°.

Having thus disclosed the invention, what is claimed is:

A compound selected from the group consisting of a compound of the formula:

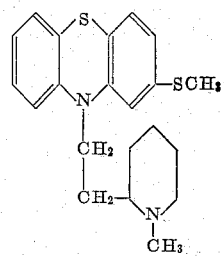

and its pharmaceutically acceptable non-toxic acid salts.

References Cited by the Examiner

UNITED STATES PATENTS

| | | | |
|---|---|---|---|
| 2,272,498 | 2/1942 | Zerweck et al. | 260—243 |
| 2,485,212 | 10/1949 | Miescher et al. | 260—243 |
| 2,534,237 | 12/1950 | Cusic | 260—243 |
| 2,590,125 | 3/1952 | Robinson | 260—243 |
| 2,784,185 | 3/1957 | Schuler | 260—243 |
| 2,789,978 | 4/1957 | Rath | 260—243 |
| 2,901,478 | 8/1959 | Schuler | 260—243 |

OTHER REFERENCES

Lowy et al.: "Introduction to Organic Chemistry," 6th ed., page 213, John Wiley and Sons (N.Y.) (1945).

WALTER A. MODANCE, *Primary Examiner.*

H. J. LIDOFF, *Examiner.*

E. MERKER, JOHN D. RANDOLPH,
*Assistant Examiners.*

UNITED STATES PATENT OFFICE
CERTIFICATE OF CORRECTION

Patent No. 3,239,514                      March 8, 1966

Jany Renz et al.

It is hereby certified that error appears in the above numbered patent requiring correction and that the said Letters Patent should read as corrected below.

Column 1, lines 54 and 55, strike out "wherein $R_1$ has the afore-recited significances, with an $\omega$-nificances," and insert instead -- wherein $R_2$, $R_3$ and $R_4$ have the previously recited significances, --; column 6, line 16, for "anilline" read -- aniline --; column 11, line 16, for "adidtion" read -- addition --.

Signed and sealed this 23rd day of August 1966.

(SEAL)
Attest:

ERNEST W. SWIDER
Attesting Officer

EDWARD J. BRENNER
Commissioner of Patents